Patented Jan. 27, 1942

2,271,482

UNITED STATES PATENT OFFICE 2,271,482

METHOD FOR RECOVERING COPPER FROM COPPER SLUDGE DERIVED FROM WASTE INDUSTRIAL LIQUORS CONTAINING LIME AND CELLULOSE

Franz Hoelkeskamp and Ewald Knehe, Wuppertal-Barmen, Germany, assignors to American Bemberg Corporation, New York, N. Y., a corporation of Delaware No Drawing. Application November 28, 1939, Serial No. 306,530. In Germany November 12, 1938

4 Claims. (Cl. 23—55)

This invention relates to improvements in methods for recovering copper from waste industrial liquors containing copper and of which the sludge produced therefrom contains lime and cellulose.

It is an object of the invention to provide methods adapted to remove the lime and cellulose impurities from such sludge while at the same time converting the copper values thereof into soluble organic salts which can then be treated for recovering the copper therefrom.

It is a further object of the invention to provide a method by means of which certain of the impurities in such waste liquors or sludge are precipitated out or carried away in adsorbed condition by other present impurities so that they become rapidly precipitated out, thus producing a substantially clear copper salt solution which can be handled by simple filtration or decantation.

When ammoniacal copper oxide cellulose solutions are worked up into artificial structures such as artificial fibres, artificial silk, films, and the like, large quantities of waste liquors are produced such as those of acid nature containing copper as well as spinning bath wastes of ammoniacal nature, also containing copper. From the latter the copper may, among other things and under certain circumstances, be precipitated out, for example by means of lime. This produces a so-called copper sludge which consists essentially of copper hydroxide, lime, calcium sulphate, and calcium carbonate, as well as a considerable quantity of organic substances originating from the spinning process such as cellulose and other impurities.

Various attempts have been made to work up this sludge so as to be able to recover the copper in some sort of serviceable form. Thus, in the prior art, the sludge has been dried and converted into metallic copper by metallurgical operations. It has also been attempted to leach out the sludge with sulphuric acid. Such prior art methods however produce an exceptionally dirty copper sulphate solution which, in addition to calcium sulphate and iron also contains organic substances in dissolved and undissolved form. In order to obtain a serviceable copper sulphate from such a solution the dissolved calcium sulphate, iron, and cellulose must be removed and the dissolved organic material must be gotten out of the way by oxidation with strong oxidizing agents. Such a purification treatment is obviously tedious and above all very expensive.

In accordance with the present invention a method is provided for working up copper sludge that contains lime and cellulose. The basis of the method is as follows:

The lime compounds present in the above mentioned copper sludge are first converted into an insoluble form such as calcium carbonate, calcium oxalate, and the like. In practice, the said lime compounds are treated for this purpose with a soluble carbonate such as sodium carbonate, the quantity used being sufficient to effect conversion into calcium carbonate. Thereupon the entire material is treated with calculated quantities of ammonium salt such as ammonium sulphate or ammonium chloride and free ammonia in order to convert the copper into the soluble copper tetramine salt. In this connection it is of importance that the amount of ammonium salt calculated for the copper present should be such as to correspond to the stoichiometric ratio involved, that is, so that at least 4 ammonia "residues" (i. e. amidogens or $NH_2$ radicles) of the ammonium salt are used to 1 mol. of copper. The quantity of free ammonia present should amount to say 2½ mol. per 1 mol. of copper. If too little ammonium salt is used, not all of the copper would be converted into the tetrammine salt and there would be danger that the cellulose present would become partially dissolved. Similarly, in this connection it is of importance that the free ammonia be added first after the ammonium salt since otherwise there would be danger that the intermediately formed copper-oxide-amomnia base would in its turn dissolve the cellulose. However, if the amonium salt is used in at least the indicated stoichiometric quantities, then (as has been established experimentally) a dissolution of the cellulose will not occur even if thereafter a large excess of free ammonia is used. If the chemicals are used in the order recited in the illustrative embodiments and as outlined above, and in the indicated quantity ratios, the calcium carbonate will settle to the bottom with great rapidity and serve to carry the cellulose, iron, and like impurities in adsorbed condition along with it. The supernatant solution thus obtained is practically clear and contains essentially only the copper in the form of copper tetrammine salt. The separation of the solution from the precipitate is effected so perfectly that filtration may usually be dispensed with and the separation effected solely by decantation. The copper tetrammine solution thus obtained is worked up in any suitable manner.

If the process is initiated by using a soluble carbonate, for example in the form of ammonium carbonate, a double action takes place right at the outset inasmuch as the ammonium carbonate, for one thing, precipitates the calcium compounds as calcium carbonate and since, for another thing, if used in adequate quantities, it also assumes the functions of another ammonium salt. In such a case the quantity of the added ammonium carbonate should be calculated so that for 1 mol. of calcium oxide, 1 mol. of ammonium carbonate, and so that for 1 mol. of copper, 2 mols. of ammonium carbonate and 2½ mol. of ammonia are used. This would then produce ratios analogous to those recited above for other ammonium salts.

Illustrative embodiments of the present invention are given by way of the following examples:

Example 1

250 parts by weight of copper sludge containing .66 part by weight of CaO and 1.48 parts by weight of Cu are treated with 1.25 parts by weight of $Na_2CO_3$ (in the form of say a 10% solution) and thoroughly stirred. Thereupon 6.15 parts by weight of $(NH_4)_2SO_4$ in the form of a 10% solution are added, the material stirred again, whereupon 1.01 parts by weight of $NH_3$ in the form of a 24% solution are added. After thorough mixing the precipitate settles out within a few minutes.

Example 2

Same as Example 1, except with the difference that in lieu of $(NH_4)_2SO_4$, 5 parts by weight of $NH_4Cl$ in the form of a 10% solution are used.

Example 3

The above recited quantity of copper sludge is first treated with 1.25 parts by weight of $Na_2CO_3$ and thereupon with 5.32 parts by weight of $(NH_4)_2CO_3.H_2O$ in the form of a 10% solution and finally with 1.01 parts by weight of $NH_3$ in the form of a 24% aqueous ammonia.

Example 4

The above recited quantity of copper sludge is treated with 6.66 parts by weight of

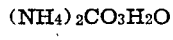
$(NH_4)_2CO_3H_2O$ in the form of a 10% solution and then, after stirring, 1.01 parts by weight of $NH_3$ are added thereto in the form of a 24% aqueous ammonia.

Example 5

The above recited quantity of copper sludge is first treated with 1.34 parts by weight of

$(NH_4)_2CO_3.H_2O$ in aqueous solution and the whole is thoroughly stirred; thereupon 6.15 parts by weight of $(NH_4)_2SO_4$ are added and after further thorough stirring, 1.01 parts by weight of $NH_3$ are finally added in the form of a 24% aqueous ammonia.

Example 6

Same as Example 5, with the difference that in lieu of 6.15 parts by weight of $(NH_4)_2SO_4$, 5 parts by weight of $NH_4Cl$ are used in the form of a 10% solution.

We claim:

1. In the method of preparing pure solutions of copper tetrammine salts from sludge originating from the manufacture of artificial fibres from ammoniacal copper oxide cellulose solutions and containing, besides copper hydroxide and lime, contaminations insoluble in an ammonium salt and free ammonia comprising calcium carbonate, calcium sulphate and cellulose, the steps in sequence which comprise converting all of the lime contained in said sludge into a calcium compound which will subsequently remain insoluble upon the addition of an ammonium salt and free ammonia, adding at least 4 moles of an aqueous solution of an ammonium salt to said sludge per mole of copper contained therein, adding at least 2½ moles of free ammonia to said sludge per mole of copper contained therein to form a copper tetrammine salt solution containing solid, agglomerated contaminations and mechanically separating said contaminations from said solution.

2. In the method of preparing pure solutions of copper tetrammine salts from sludge originating from the manufacture of artificial fibres from ammoniacal copper oxide cellulose solutions and containing, besides copper hydroxide and lime, contaminations insoluble in an ammonium salt and free ammonia comprising calcium carbonate, calcium sulphate and cellulose, the steps in sequence which comprise converting all of the lime contained in said sludge into a calcium compound which will subsequently remain insoluble upon the addition of an aqueous solution of an ammonium salt and free ammonia, adding at least 4 moles of ammonium sulphate to said sludge per mole of copper contained therein, adding at least 2½ moles of free ammonia to said sludge per mole of copper contained therein to form a copper tetrammine salt solution containing solid, agglomerated contaminations and mechanically removing said contaminations from said solution.

3. In the method of preparing pure solutions of copper tetrammine salts from sludge originating from the manufacture of artificial fibres from ammoniacal copper oxide cellulose solutions and containing, besides copper hydroxide and lime, contaminations insoluble in an ammonium salt and free ammonia comprising calcium carbonate, calcium sulphate and cellulose, the steps in sequence which comprise converting all of the lime contained in said sludge into a calcium compound which will subsequently remain insoluble upon the addition of an aqueous solution of an ammonium salt and free ammonia, adding at least 4 moles of ammonium chloride to said sludge per mole of copper contained therein to form a copper tetrammine salt solution containing solid, agglomerated contaminations and mechanically removing said contaminations from said solution.

4. In the method of preparing pure solutions of copper tetrammine salts from sludge originating from the manufacture of artificial fibres from ammoniacal copper oxide cellulose solutions and containing, besides copper hydroxide and lime, contaminations insoluble in an ammonium salt and free ammonia comprising calcium carbonate, calcium sulphate and cellulose, the steps which comprise converting all of the lime contained in said sludge into calcium carbonate, adding at least 4 moles of an aqueous solution of an ammonium salt to said sludge per mole of copper contained therein, adding at least 2½ moles of free ammonia to said sludge per mole of copper contained therein to form a copper tetrammine salt solution containing solid, agglomerated contaminations and mechanically separating said contaminations from said solution.

FRANZ HOELKESKAMP.
EWALD KNEHE.